US012741735B1

(12) United States Patent
Mardirossian

(10) Patent No.: US 12,741,735 B1
(45) Date of Patent: Sep. 22, 2026

(54) CHORD LINE AND CAMBER ADJUSTING WING

(71) Applicant: Kevin Mardirossian, Simi Valley, CA (US)

(72) Inventor: Kevin Mardirossian, Simi Valley, CA (US)

( * ) Notice: Subject to any disclaimer, the term of this patent is extended or adjusted under 35 U.S.C. 154(b) by 21 days.

(21) Appl. No.: 18/945,133

(22) Filed: Nov. 12, 2024

Related U.S. Application Data

(60) Provisional application No. 63/548,137, filed on Nov. 10, 2023.

(51) Int. Cl.
*B64C 3/48* (2006.01)
*B64C 3/54* (2006.01)

(52) U.S. Cl.
CPC . *B64C 3/48* (2013.01); *B64C 3/54* (2013.01)

(58) Field of Classification Search
CPC ....... B64C 3/48; B64C 3/54; B64C 2003/445; B64C 2003/543
See application file for complete search history.

(56) References Cited

U.S. PATENT DOCUMENTS 1,291,260 A * 1/1919 Thompson ................ B64C 3/54 244/218
3,904,152 A * 9/1975 Hill ........................... B64C 3/54 244/214
5,367,970 A 11/1994 Beauchamp
5,538,202 A 7/1996 Thornburg
5,971,328 A 10/1999 Kota
6,276,641 B1 8/2001 Gruenewald
6,481,667 B1 11/2002 Ho
6,491,262 B1 12/2002 Kota
7,384,016 B2 6/2008 Kota et al.
7,837,144 B2 * 11/2010 Kothera .................... B64C 9/00 92/92
9,856,013 B2 * 1/2018 Paris Carballo .......... B64C 3/48
10,889,365 B2 1/2021 Bowers
11,377,196 B2 7/2022 Shields
11,401,027 B2 * 8/2022 Bae ........................... B64C 3/48
11,834,171 B2 * 12/2023 Kelly ..................... B64U 10/25
2008/0035798 A1 * 2/2008 Kothera ............... B63H 25/382 244/212
2015/0298792 A1 * 10/2015 Paris Carballo .......... B64C 3/48 244/45 R (Continued)

FOREIGN PATENT DOCUMENTS

CN 116714759 A * 9/2023 ............... B64C 3/42
GB 2386884 A * 10/2003 ............... B64C 3/48
WO WO 2022/104779 5/2022

*Primary Examiner* — Joseph W Sanderson
(74) *Attorney, Agent, or Firm* — Cislo & Thomas LLP

(57) ABSTRACT

A wing having a front section with a leading edge, a back section with a trailing edge, and a main body therebetween in which the back section and, optionally, the front section are movably connected to the main body to change a length of the chord line and a radius of the camber of the wing. The connections are configured such that a top surface of the front section, a bottom surface of the front section, a top surface of the back section, and a bottom surface of the back section can move, relative to the main body, in the fore and aft direction, simultaneously, sequentially, or alternatingly, and in any order to change the length L of the chord line and the radius of the camber.

14 Claims, 5 Drawing Sheets

(56) References Cited

U.S. PATENT DOCUMENTS

2021/0331781 A1* 10/2021 Bae .......................... B64C 3/182
2022/0250736 A1 8/2022 Kelly
2022/0306276 A1 9/2022 Kelly
2024/0092474 A1* 3/2024 Luo ............................ B64C 3/48

* cited by examiner

CHORD LINE AND CAMBER ADJUSTING WING

CROSS-REFERENCE TO RELATED APPLICATION

This patent application claims the benefit of U.S. Provisional Patent Application Ser. No. 63/548,137, entitled "Chord Adjusting Bidirectional Airfoil Morphing," filed Nov. 10, 2023, which application is incorporated in its entirety here by this reference.

TECHNICAL FIELD

This invention relates to wings.

BACKGROUND

Wings of an aircraft are designed to allow the trailing edge to move to change the size of the surface area as well as the shape (e.g., camber) of the wing to perform various functions. However, the number of component parts used in prior art devices to create a structurally sound wing with moving parts that can change the size of the surface area and shape of the wing increases the number of potential failure points. In addition, using traditional hinged configurations limits the consistency of curvature, thereby reducing aerodynamic efficiency.

The ability for the wing's chord length to significantly increase or decrease and adjust camber presents a uniquely effective method to increase the efficiency of an aircraft's wing by increasing the aspect ratio. Other methods of wing augmentation, through the changes in curvature, do not allow for this benefit. Additionally, the ability to independently change the extension of the wing sections at the root, tip, trailing, and leading edges presents the possibility for non-orthogonal changes in a wing's shape. For example, the leading edge slats on an aircraft extend outward from the leading edge of a wing orthogonally, increasing the effective chord length of the wing.

For the foregoing reasons there is a need for a new wing design that can change the surface area size and shape while minimizing the number of components required without sacrificing the integrity and efficiency of the wing.

SUMMARY

The present invention is directed to a new wing and method for augmenting a camber and chord length of a wing shape using slip joints at the interface between a front section of the wing defining the leading edge and the main body of the wing, as well as the back section of the wing defining the trailing edge and the main body. The method of actuation allows for continuous and independent relative movement of top and bottom surfaces of the front section and the back section relative to the main body. Using the methods described herein, the chord length may be increased at the root of the wing, while remaining unchanged or decreasing at the tip of the wing to create a 'taper' in the wing's shape, which is an attractive feature found on many aircraft.

As such, the wing comprises a front section defining a leading edge, a back section defining a trailing edge, and a main airfoil section (MAS) or main body in between the front section and the back section. The method of wing augmentation may be applied to either or both the leading and trailing edges of said wing.

The wing can be segmented approximately perpendicular to the mean chord line into these front section, main body, and back section components. In the preferred embodiments, tabs extending from the front section and back section can move beneath the surface of the MAS or main body such that symmetric translation results in a change in chord length, or the distance between the leading edge and trailing edge of the wing when measured along the mean chord line. In addition, asymmetric translation of these tabs causes the deformation of the front section or back section skins such that the resulting shape is a wing with a greater difference in camber, or curvature length between the top and bottom wing surfaces. Top and bottom tabs of the front section and/or back section can use separate actuators, allowing for the independent control of the tab translations.

The resultant shapes created by the translation of the tabs form a wing with a more consistent curvature than traditional hinged configurations, resulting in greater aerodynamic efficiency. The augmentation of the chord length and camber affects the lift and drag created by a wing. Depending on the exact state of motion, load, and airspeed experienced by the wing and the desired effect of the wing, the ability to independently or simultaneously change the chord length and camber of a wing increases control and optimizes the performance of the main body defined by such wing.

The main body may be constructed using traditional methods and materials, according to the application. The front section and back section can be constructed of a material that is readily capable of elastic deformation at the thickness of the wing skin when flexed. Examples of such materials include thin-gauge aluminum, fabrics, and polymers.

Extensions of the wing curvature can be created for both the top and bottom skins of the front section and/or back section to form tabs having the thickness of the wing skin. The length of the tabs determines the extent to which the chord length may be increased, and the amount of change in camber. Inside the main body are slots that follow the curvature of the wing. These slots can be longer and thicker than the tabs such that the extension of the tabs can fit within these slots.

With the front and back section tabs slid inside the main body slots the wing assembly is created. The tabs can slide forward and rearward within their respective slots through the use of an actuator that allows for fine control of the translation of the tabs and can be powerful enough to move the tabs and cause the deformation of the front and back section skins.

DETAILED DESCRIPTION OF THE INVENTION

Figure 1:
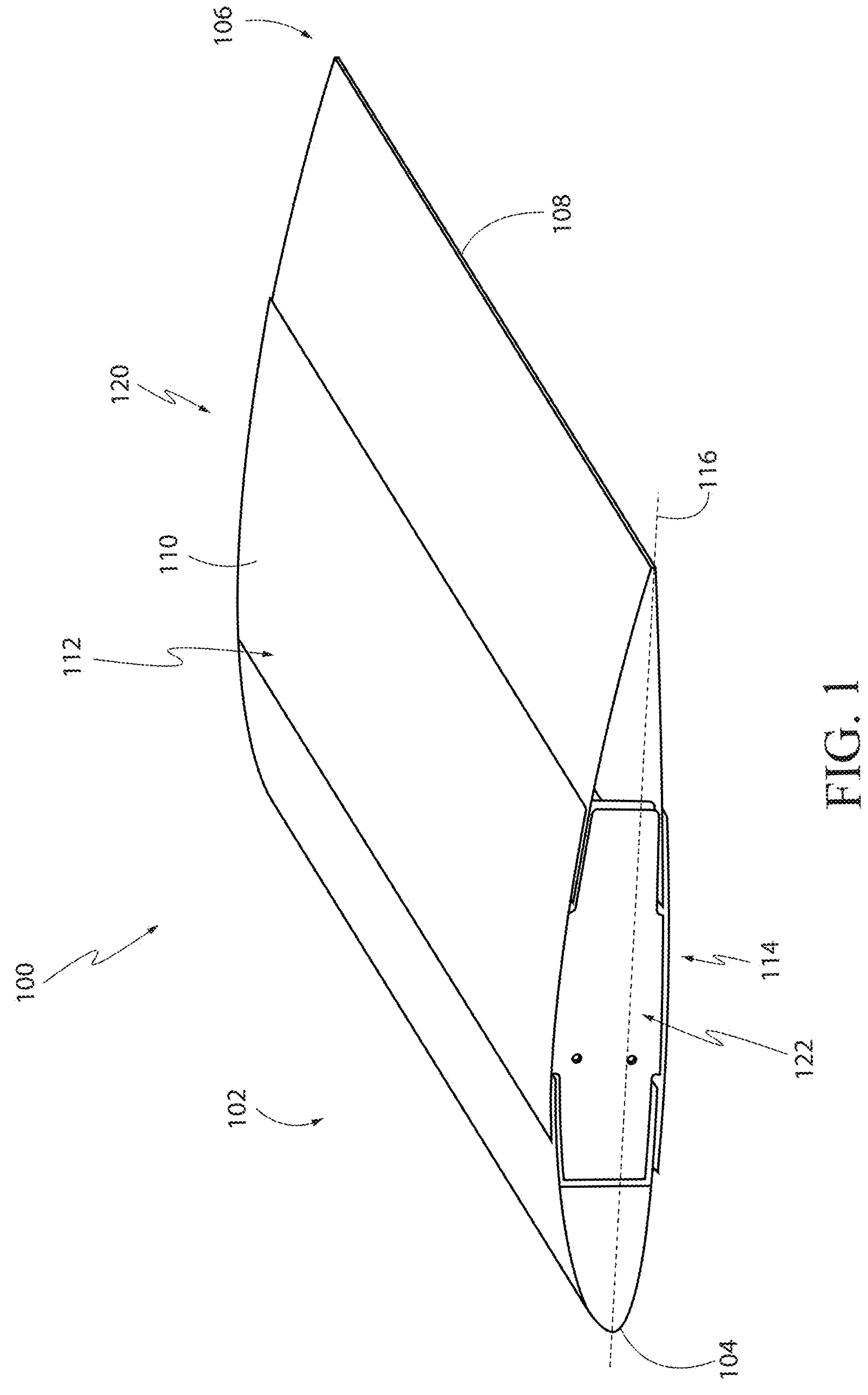
FIG. 1 shows a perspective view of a wing of the present invention.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Directional terms, such as front, back, fore, aft, left, right, top, bottom, lateral, medial, and the like, are with respect to the wing being attached to the body of an aircraft, such as an airplane, in which the front or forward end is the nose of the airplane, the back or rearward end is the tail of the airplane, the lateral or outboard direction is away from the fuselage or body of the airplane, the medial or inboard direction is in the direction of the fuselage, the bottom is in the direction of the belly or ventral side of the airplane where the wheels generally deploy, and the top is in the direction of the dorsal side of the aircraft opposite the ventral side. These terms are not intended to be limiting, but rather, used for convenience and ease of description.

With reference to FIGS. 1-4, the invention of the present application is directed towards a wing 100 comprising a front section 102 defining a leading edge 104; a back section 106 defining a trailing edge 108 opposite the front section 102; a main body 110 in between the front section 102 and the back section 106; a top surface 112 extending from the leading edge 104 to the trailing edge 108; a bottom surface 114 opposite the top surface 112 extending from the leading edge 104 to the trailing edge 108; an outboard or tip end 120 adjacent to the front section 102, the main body 110, and the back section 106; and an inboard or root end 122 opposite the outboard end 120, and adjacent to the front section 102, the main body 110, and the back section 106, wherein the wing 100 defines a chord line 116 from the leading edge 104 to the trailing edge 108, wherein the top surface 112 defines a camber 118, and wherein a length L of the chord line 116 and a radius R of the camber 118 can be changed by moving the front section 102 and/or the back section 106 relative to the main body 110. Preferably, movement of the front section 102 and/or the back section 106 relative to the main body 110 to change the length L of the chord line 116 and/or the radius R of the camber 118 is by a sliding action in the fore and aft direction. As such, the movement of the front section 102 and back section 106 is towards and away from the main body 110 as shown in FIG. 5.

Figures 5, 6, 7:
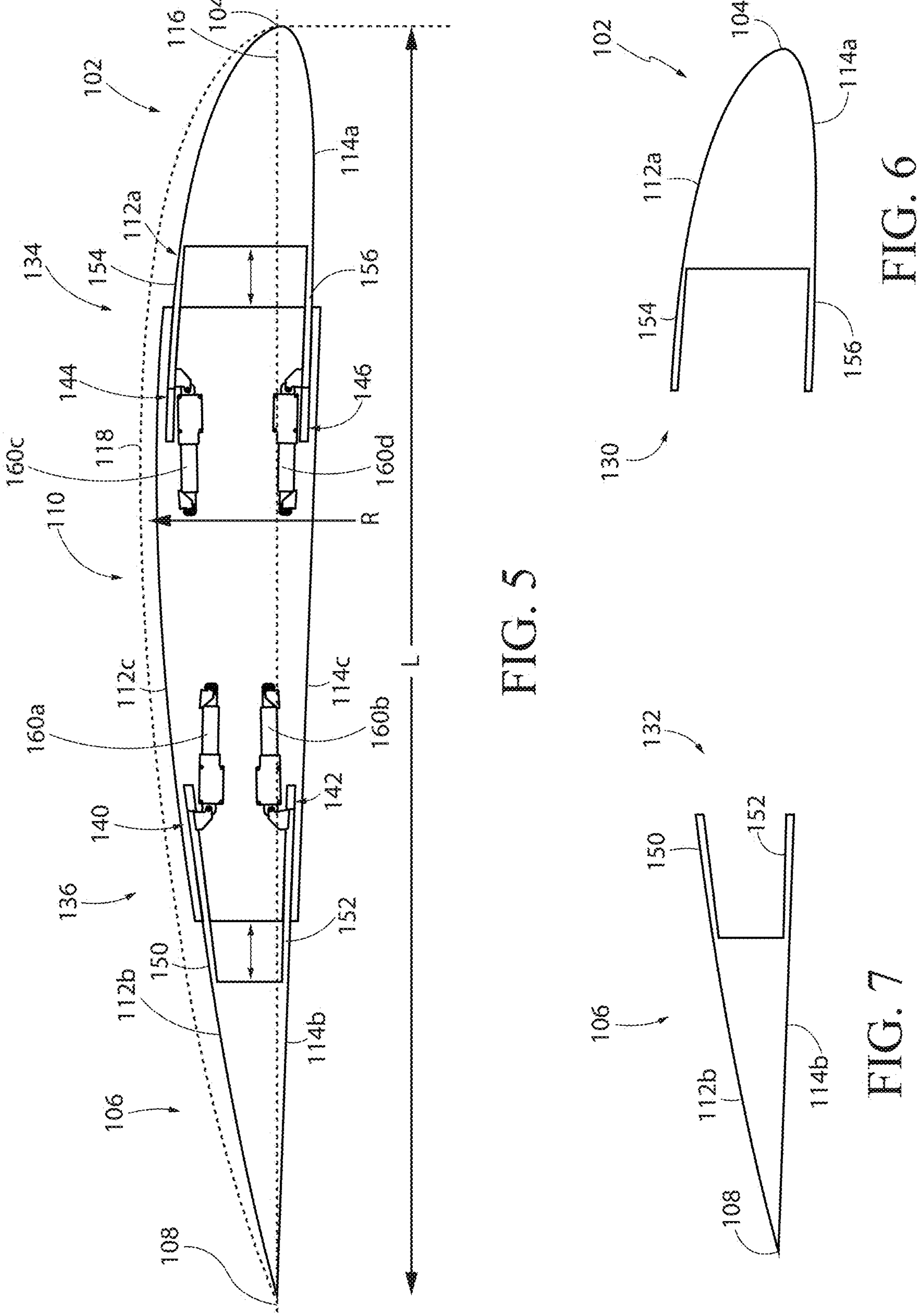
FIG. 5 shows a side elevation view of another embodiment of the present invention.
FIG. 6 shows a side elevation view of an embodiment of the front section.
FIG. 7 shows a side elevation view of an embodiment of the back section.

More preferably, as shown in FIGS. 5-7, the front section 102 and the back section 106 can be separate components from the main body 110, and the top surface 112*a* at the front section 102 and the top surface 112*b* at the back section 106 can slide fore and aft relative to the top surface 112*c* at the main body 110. Similarly, the bottom surface 114*a* at the front section 102 and the bottom surface 114*b* at the back section 106 can slide fore and aft relative to the bottom surface 114*c* at the main body 110. As separate sections, the front section 102 can move independently from the back section 106 and the back section 106 can move independently from the front section 102.

Similarly, the fore and aft sliding action of the top surfaces 112*a*, 112*b* relative to the bottom surfaces 114*a*, 114*b* at the front and back sections 102, 106 can also be independent of each other. For example, the top surface 112*b* at the back section 106 can slide in the fore direction (towards the main body 110) while all other surfaces remain stationary to cause the radius R of the camber 118 to flatten out. To further flatten out the camber 118, the bottom surface 114*b* at the back section 106 can slide in the aft direction (away from the main body 110). These movements can occur simultaneously, sequentially, or alternatingly, and in any order.

As another example, the top surface 112*b* at the back section 106 can slide in the aft direction while all other surfaces remain stationary to cause the radius R of the camber 118 to decrease creating more concave curvature in the camber 118. To further increase the curvature (or decrease the radius R) of the camber 118, the bottom surface 114*b* at the back section can slide in the fore direction. These movements can occur simultaneously, sequentially, or alternatingly, and in any order.

Furthermore, the top surface 112*b* and the bottom surface 114*b* at the back section 106 can move simultaneously, sequentially, or alternatingly, and in any order, in the fore direction to decrease the length L of the chord line 116, or move in the aft direction simultaneously, sequentially, or alternatingly, and in any order, to increase the length L of the chord line 116.

Similarly, at the front section 102, the top surface 112*a* can slide in the fore direction (away from the main body 110) while all other surfaces remain stationary to cause the radius R of the camber 118 to decrease creating more concave curvature in the wing 100. To further increase the curvature of the camber 118, the bottom surface 114*a* at the front section 102 can slide in the aft direction (toward the main body 110). These movements can occur simultaneously, sequentially, or alternatingly, and in any order.

In addition, the top surface 112*a* at the front section 102 can slide in the aft direction while all other surfaces remain stationary to cause the radius R of the wing 100 to flatten. To further flatten the curvature of the camber 118, the bottom surface 114*a* at the front section 102 can slide in the fore direction. These movements can occur simultaneously, sequentially, or alternatingly, and in any order.

Furthermore, the top surface 112*a* and the bottom surface 114*a* at the front section 102 can move simultaneously, sequentially, or alternatingly, and in any order, in the fore direction to increase the length L of the chord line 116, or move in the aft direction simultaneously, sequentially, or alternatingly, and in any order to decrease the length L of the chord line 116.

As such, independent, simultaneous, sequential, or alternating movement in any order, of the top and bottom surfaces in the fore and aft direction at the front and back sections can be coordinated to fine tune the radius R of curvature of the camber 118 and length L of the chord line 116 of the wing 100 for the desired effect. As such, asymmetrical movement of the top surface 112*b* at the front side 132 of the back section 106 and the bottom surface 114*b* at the front side 132 of the back section 106 changes the configuration of the wing 100 by changing the radius R of the camber 118, and symmetrical movement of the top surface 112*b* at the front side 132 of the back section 106 and the bottom surface 114*b* at the front side 132 of the back section 106 changes the configuration of the wing 100 by changing the length L of the chord line 116. Similarly, asymmetrical movement of the top surface 112*a* at the back side 130 of the front section 102 and the bottom surface 114*a* at the back side 130 of the front section 102 changes the configuration of the wing 100 by changing the radius R of the camber 118, and symmetrical movement of the top surface 112*a* at the back side 130 of the front section 102 and the bottom surface 114*a* at the back side 130 of the front section 102 changes the configuration of the wing 100 by changing the length L of the chord line 116.

Aside from the coordinated movement of the top surfaces 112*a*, 112*b* and their respective bottom surfaces 114*a*, 114*b*, movement of the top surfaces 112*a*, 112*b* in the span-wise direction (from the outboard end 120 to the inboard end 122) can be coordinated at the outboard end 120 and the inboard end 122. Similarly, movement of the bottom surfaces 114*a*, 114*b* in the span-wise direction can be coordinated at the outboard end 120 and the inboard end 122. These coordinated movements can change the camber 118 and chord line 116 along the span of the wing 100 from the outboard end 120 to the inboard end 122 to create span-wise camber variability, allowing for the ability to dynamically tune the washout of the wing 100.

To effectuate these coordinated movements, the front section 102 of the wing 100 comprises the leading edge 104 and a back side 130 of the front section 102 opposite the leading edge 104. The back section 106 of the wing 100 comprises the trailing edge 108 and a front side 132 of the back section 106 opposite the trailing edge 108. The main body 110 comprises a forward end 134 and a rearward end 136 opposite the forward end 134. The forward end 134 of the main body 110 can be connected to the back side 130 of the front section 102, and the rearward end 136 of the main body 110 can be connected to the front side 132 of the back section 130. Preferably, the front side 132 of the back section 106 is movably connected to the rearward end 136 of the main body 110 so that the back section 130 can move fore and aft relative to the main body 110. More preferably, the back side 130 of the front section 102 is also movably connected to the forward end 134 of the main body 110 so that the front section 102 can also move fore and aft relative to the main body 110.

In the preferred embodiment, the fore and aft movement of the front section 102 and the back section 106 relative to the main body 110 is effectuated by configuring the wing 100 with slots and tabs. For example, the main body 110 can define a top-rear slot 140 adjacent the top surface 112*c* of the main body 10 at the rearward end 136, a bottom-rear slot 142 adjacent the bottom surface 114*c* of the main body 110 at the rearward end 136, a top-front slot 144 adjacent the top surface 112*c* of the main body 110 at the forward end 134, and a bottom-front slot 146 adjacent the bottom surface 114*c* of the main body 110 at the forward end 134.

The back section 106 can comprise a top-rear tab 150 extending from the front side 132 of the back section 106 at the top surface 112*b* of the back section 106 away from the trailing edge 108, and a bottom-rear tab 152 extending from the front side 132 of the back section 106 at the bottom surface 114*b* of the back section 106 away from the trailing edge. The front section 102 can comprise a top-front tab 154 extending from the back side 130 of the front section 102 at the top surface 112*a* of the front section 102 away from the leading edge 104, and a bottom-front tab 156 extending from the back side 130 of the front section 102 at the bottom surface 114*a* of the front section 102 away from the leading edge 104.

The top-rear tab 150 and the top-rear slot 140 are configured so that the top-rear tab 150 can slide in and out of the top-rear slot 140. The bottom-rear tab 152 and the bottom-rear slot 142 are configured so that the bottom-rear tab 152 can slide in and out of the bottom-rear slot 142. The top-front tab 154 and the top-front slot 144 are configured so that the top-front tab 154 can slide in and out of the top-front slot 144. The bottom-front tab 156 and the bottom front-slot 146 are configured so that the bottom-front tab 156 can slide in and out of the bottom-front slot 146.

In the preferred embodiment, the slots 140, 142, 144, 146 and the tabs 150, 152, 154, 156 can span substantially the entire length of the wing 100 from the inboard end 122 to the outboard end 120. Having the slots 140, 142, 144, 146 and the tabs 150, 152, 154, 156 to span the entire length of the wing 100 allows for better fine tuning of the coordinated movements by placing actuators at strategic locations, and being able to adjust the locations of the actuators. Nonetheless, a plurality of shorter tab and slot segments can be intermittently spaced apart along the span of the wing 100 at strategic locations.

A first actuator 160*a* can connect the rearward end 136 of the main body 110 to the top surface 112*b* of the back section 106. For example, the first actuator 160*a* can be connected and configured to move the top-rear tab 150 in and out of the top-rear slot 140. A second actuator 160*b* can connect the rearward end 136 of the main body 110 to the back section 106. For example, the second actuator 160*b* can be connected and configured to move the bottom-rear tab 152 in and out of the bottom-rear slot 142.

The first actuator 160*a* can also connect the forward end 134 of the main body 110 to the front section 102. For example, the first actuator 160*a* can be connected and configured to move the top-front tab 154 in and out of the top-front slot 144. In some embodiments, the front section 102 can be connected to the main body 110 via a third actuator 160*c*. For example, a third actuator 160*c* can be connected and configured to move the top-front tab 154 in and out of the top-front slot 144 as shown in FIG. 5.

The second actuator 160*b* can connect the forward end 134 of the main body 110 to the front section 102. For example, the second actuator 160*b* can be connected and configured to move the bottom-front tab 156 in and out of the bottom-front slot 146. Alternatively, the front section 102 can be connected to the main body 110 via a fourth actuator 160*d*. For example, the fourth actuator 160*d* can be connected and configured to move the bottom-front tab 156 in and out of the bottom-front slot 146.

As such, the length L of the chord line 116 and the radius R of the camber 118 are dependent on a position of the top-rear tab 150, bottom-rear tab 152, top-front tab 154, and bottom-front tab 156 within their respective top-rear slot 140, bottom-rear slot 142, top-front slot 144, and bottom-front slot 146. Therefore, a single actuator type can be used to change both the length L of the chord line 116 and the radius R of the camber 118. In other words, different actuator types are not required for adjusting the chord line 116 and the camber 118. Preferably, the actuators 160*a-d* are linear actuators, such as electric actuators, mechanical actuators, electromechanical actuators, hydraulic actuators, pneumatic actuators, and the like. Using linear actuators minimizes the number of moving parts and direction of movement. Specifically, movement for changing the chord line 116 and the camber 118 can be accomplished by a linear sliding action that is substantially parallel or in line with the top surface 112 and bottom surface 114 of the wing.

The connection between the tabs and the slots can be via a slip joint, rack and pinion, ball bearings, rollers, and the like. Using a slip joint allows the slots 140, 142, 144, 146 and the tabs 150, 152, 154, 156 to continuously extend substantially the entire span of the wing 100. Furthermore, the slip joint connection allows for the desired movements for changing the length L of the chord line 116 and the radius R of the camber 118 without having to fully disjoint the connection between the front or back sections 102, 106 from the main body 110.

In the preferred embodiment, the wing 100 can define a chamber 170 in between the top surface 112 and bottom surface 114. Housed within the chamber 170 can be a plurality of ribs 172 intermittently spaced apart from the inboard end 122 to the outboard end 120. The ribs 172 can be fixed to the main body 110 to provide structural integrity to the wing 100. At the location of an actuator 160*a*, 160*b*, one or more ribs 172*a*, 172*b* can be used as a mount to support the actuators 160*a*, 160*b*. For example, at the inboard end 122, a pair of ribs 172*a*, 172*b* can sandwich one or more actuators 160*a*, 160*b* so that the actuators 160*a*, 160*b* can be mounted on to the pair of ribs 172*a*, 172*b*. Fasteners can be used to fasten the actuators 160*a*, 160*b* to the pair of ribs 172*a*, 172*b*. The rear ends 176*a*, 176*b* of each actuator 160*a*, 160*b* can be attached to the back section 106 via a brackets 174*a*, 174*b* and the front ends 178*a*, 178*b* of each actuator 160*a*, 160*b* can be attached to the front section 102 via the same types of brackets 174*c*, 174*d*.

In the preferred embodiment, a first actuator 160*a* and a second actuator 160*b* can be mounted on to the same pair of ribs 172*a*, 172*b*, one actuator 160*a* on top of the other actuator 160*b*. As such, the rear end 176*a* of the first actuator 160*a* can be attached to the top surface 112*b* of the back section 106, such as the top-rear tab 150 via the first bracket 174*a*, and the second actuator 160*b* can be attached to the bottom surface 114*b* of the back section 106, such as the bottom-rear tab 152 via the second bracket 174*b*. Similarly, the front end 178*a* of the first actuator 160*a* can be attached to the top surface 112*a* of the front section 102, such as the top-front tab 154 via the third bracket 174*c*, and the second actuator 160*b* can be attached to the bottom surface 114*a* of the front section 102, such as the bottom-front tab 156 via the fourth bracket 174*d*.

In some embodiments, the actuators 160*a-e* may be connected to the tabs 150, 152, 154, 156 via joints that allow for multiple degrees of freedom. For example, the connection between actuators 160*a-e* and the tabs 150, 152, 154, 156 can be via a ball joint, flexible joint, and the like. Allowing for multiple degrees of freedom of movement at the joint can compensate for stress and strain on the top surface 112 and bottom surface 114 of the wing 100 that can be cause by changes in the chord line 116 and camber 118, particularly when the change in the chord line 116 or camber 116 is different at the inboard end 122 compared to the outboard end 120.

Figure 2:
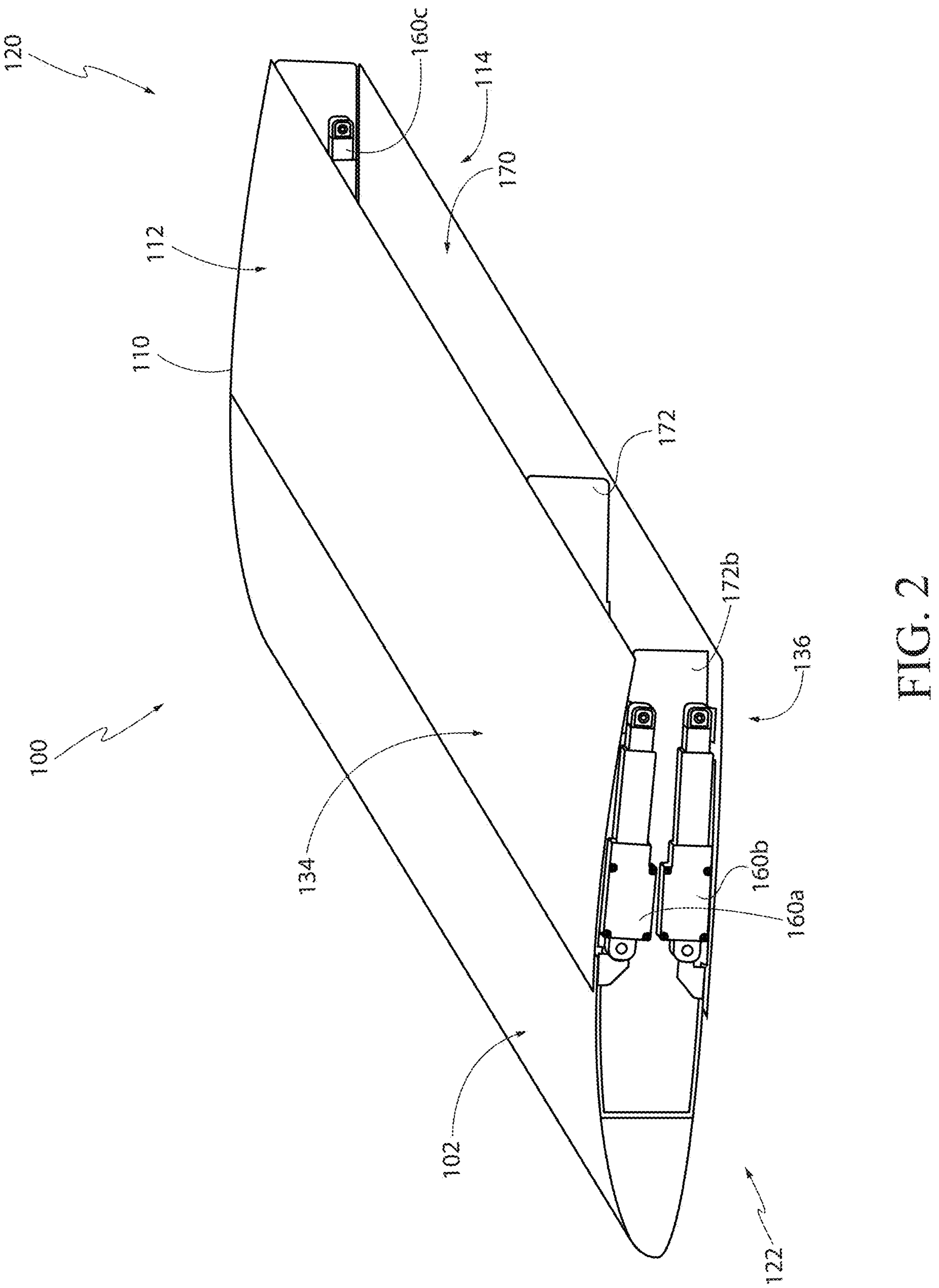
FIG. 2 shows a perspective view of another embodiment of the present invention with portions removed to see internal structures.
Figure 3:
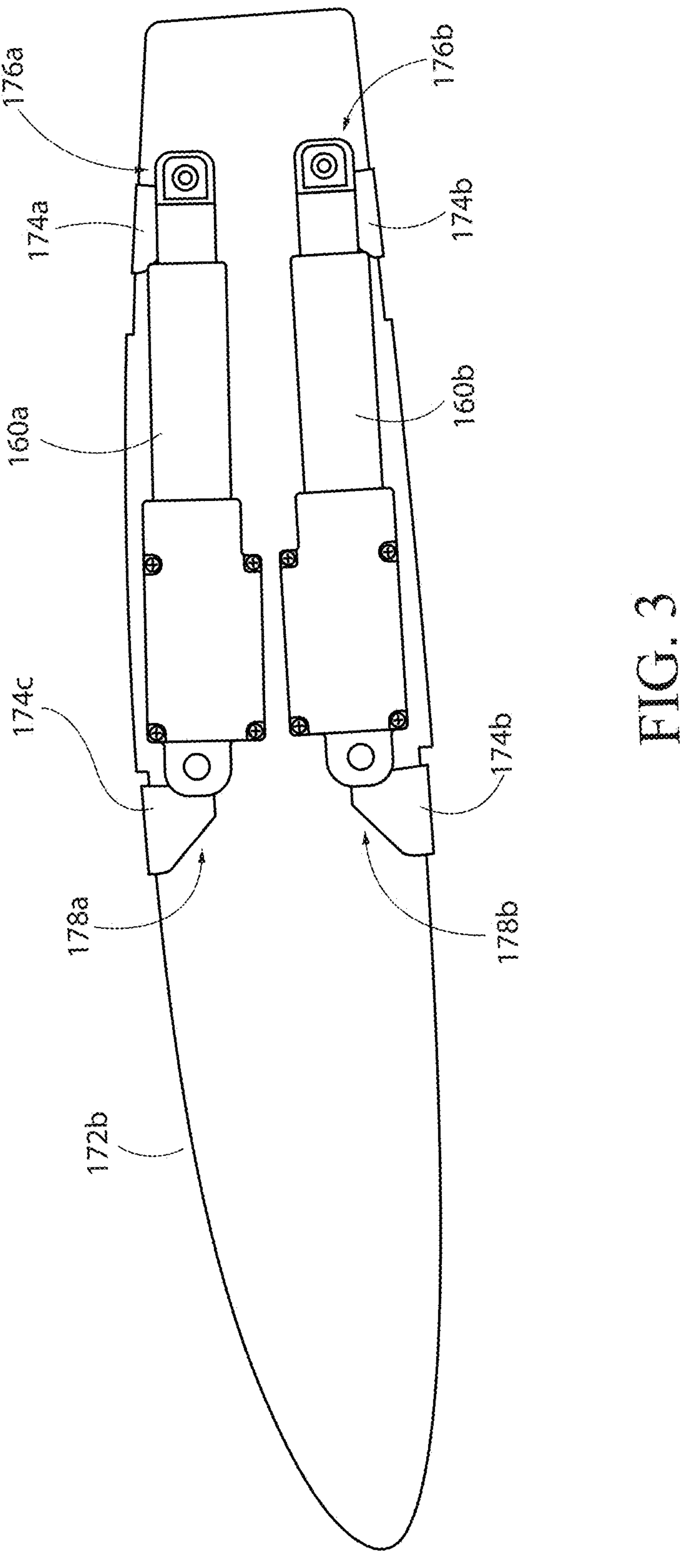
FIG. 3 shows a side elevation view of an embodiment of the wing from the inboard side, with portions of the wing removed.
Figure 4:
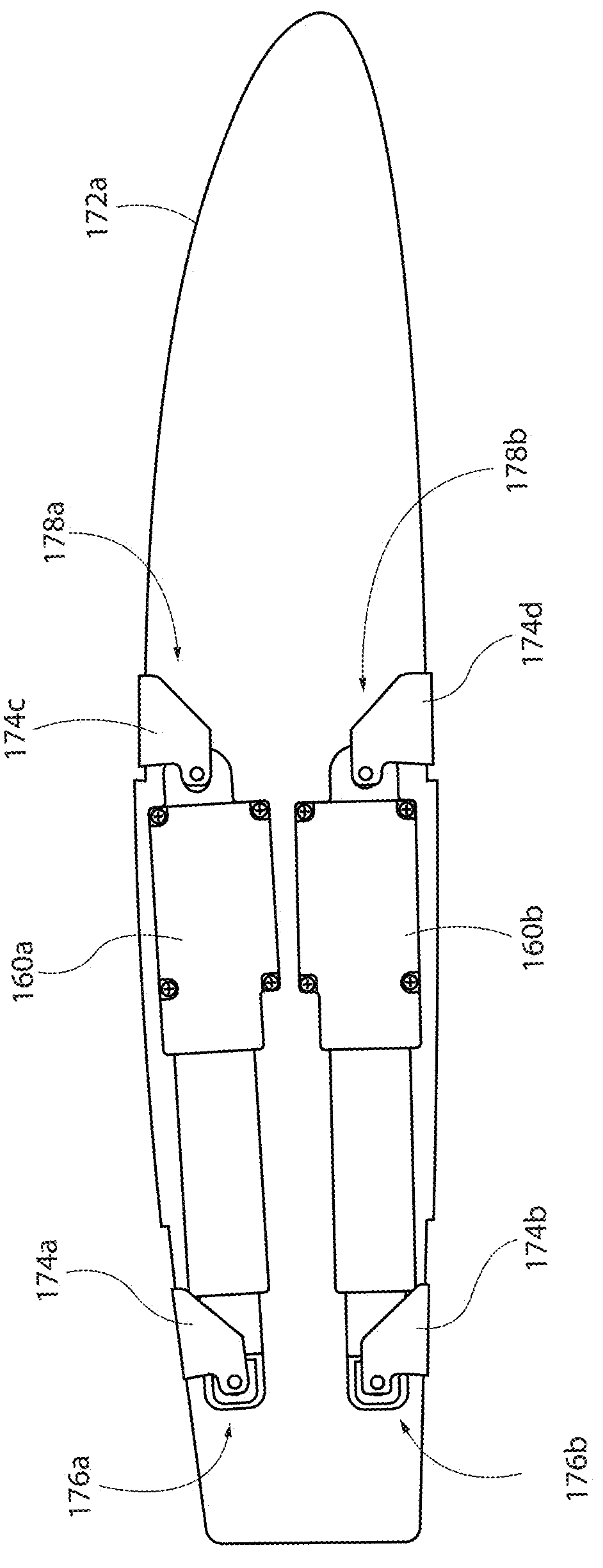
FIG. 4 shows a side elevation view of an embodiment of the wing from the outboard side, with portions of the wing removed.

In some embodiments, a third and fourth actuator 160*c*, 160*d* can be mounted on to the pair of ribs 172*a*, 172*b* at the forward end and be attached to the top surface 112*a* and bottom surface 114*a* of the front section 102. To facilitate smooth and even movement of the front section 102 or the back section 106, additional actuators 160*e* can be used anywhere along the span of the wing 100 from the inboard end 122 to the outboard end 120. For example, FIG. 2 shows actuators 160*a*, 160*b*, 160*e* at the inboard end 122 and the outboard end 120 of the. Because the ribs 172 can be placed anywhere along the span of the wing 100, the actuators can also be positioned anywhere along the span of the wing 100. In addition, due to the continuous extension of the slots 140, 142, 144, 146 and the tabs 150, 152, 154, 156, throughout the span of the wing 100, finely tuned placement of the ribs 172 and actuators 160*a-e* can be achieved for best results.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A wing, comprising:

a) a front section defining a leading edge and a back side opposite the leading edge;

b) a back section opposite the front section, the back section defining a trailing edge and a front side opposite the trailing edge;

c) an outboard end adjacent to the front section and the back section;

d) an inboard end opposite the outboard end, and adjacent to the front section and the back section;

e) a main body in between the front section and the back section, the main body comprising:

i) a forward end; and ii) a rearward end opposite the forward end, wherein the forward end of the main body is connected to the back side of the front section, and the rearward end of the main body is movably connected to the front side of the back section;

f) a top surface from the leading edge to the trailing edge;

g) a bottom surface opposite the top surface from the leading edge to the trailing edge;

h) a top-rear slot defined in the main body adjacent the top surface of the main body at the rearward end;

i) a bottom-rear slot defined in the main body adjacent the bottom surface of the main body at the rearward end;

j) a top-front slot defined in the main body adjacent the top surface of the main body at the forward end;

k) a bottom-front slot defined in the main body adjacent the bottom surface of the main body at the forward end;

l) A top-rear tab extending from the front side of the back section at the top surface of the back section;

m) a bottom-rear tab extending from the front side of the back section at the bottom surface of the back section;

n) a top-front tab extending from the back side of the front section at the top surface of the front section;

o) A bottom-front tab extending from the back side of the front section at the bottom surface of the front section;

p) a first actuator connecting the rearward end of the main body to the back section, wherein the first actuator is configured to move the top-rear tab in and out of the top-rear slot;

q) a second actuator connecting the rearward end of the main body to the back section, wherein the second actuator is configured to move the bottom-rear tab in and out of the bottom-rear slot;

r) a third actuator connecting the forward end of the main body to the front section, wherein the third actuator is configured to move the top-front tab in and out of the top-front slot;

s) a fourth actuator connecting the forward end of the main body to the front section, wherein the fourth actuator is configured to move the bottom-front tab in and out of the bottom-front slot, wherein the first, second, third, and fourth actuators are positioned at the inboard end;

t) a fifth actuator at the outboard end connecting the main body to the back section, wherein the fifth actuator is configured to act independently of the first, second, third, and fourth actuators at the inboard end, such that at least one of the length of the chord line and the radius of the camber at the inboard end is independently adjustable relative to the length of the chord line and the radius of the camber, respectively, at the outboard end;

u) wherein the wing defines a chord line from the leading edge to the trailing edge, v) wherein the top surface defines a camber, and w) wherein a length of the chord line and a radius of the camber are dependent on a position of the top-rear tab, the bottom-rear tab, the top-front tab, and the bottom-front tab within the top-rear slot, the bottom-rear slot, the top-front slot, and the bottom-front slot, respectively, wherein each slot is configured to constrain its respective tab to slide in a fore and aft direction within the slot.

2. A wing, comprising:

a) a front section defining a leading edge and a back side opposite the leading edge;

b) a back section opposite the front section, the back section defining a trailing edge and a front side opposite the trailing edge;

c) an outboard end adjacent to the front section and the back section;

d) an inboard end opposite the outboard end, and adjacent to the front section and the back section;

e) a main body in between the front section and the back section, f) a top surface from the leading edge to the trailing edge;

g) a bottom surface opposite the top surface from the leading edge to the trailing edge;

h) a top-rear slot defined in the main body adjacent the top surface of the main body at the rearward end;

i) a bottom-rear slot defined in the main body adjacent the bottom surface of the main body at the rearward end;

j) a top-rear tab extending from the front side of the back section at the top surface of the back section;

k) a bottom-rear tab extending from the front side of the back section at the bottom surface of the back section;

l) A first actuator connecting the rearward end of the main body to the back section, wherein the first actuator is configured to move the top-rear tab in and out of the top-rear slot;

m) a second actuator connecting the rearward end of the main body to the back section, wherein the second actuator is configured to move the bottom-rear tab in and out of the bottom-rear slot, wherein each slot is configured to constrain its respective tab to slide in a fore and aft direction within the slot;

n) a third actuator at the inboard end connecting the main body to the back section; and o) a fourth actuator at the outboard end connecting the main body to the back section;

p) wherein the main body comprises:

(i) a forward end; and (ii) a rearward end opposite the forward end, wherein the forward end of the main body is connected to the back side of the front section, and the rearward end of the main body is connected to the front side of the back section;

q) wherein the top surface at the front side of the back section is configured to slide towards and away from the main body, r) wherein the bottom surface at the front side of the back section is configured to slide towards and away from the main body, s) wherein the wing defines a chord line having a length from the leading edge to the trailing edge, t) wherein the top surface defines a camber having a radius, u) wherein the third actuator is configured to act independently of the fourth actuator such that at least one of the length of the chord line and the radius of the camber at the inboard end is independently adjustable relative to the length of the chord line and the radius of the camber, respectively, at the outboard end.

3. The wing of claim 2, wherein the length of the chord line and the radius of the camber are dependent on a position of the top-rear tab in the top-rear slot and the bottom-rear tab in the bottom-rear slot.

4. The wing of claim 3, wherein the first actuator is configured to act independently of the second actuator, and the second actuator is configured to act independently of the first actuator.

5. The wing of claim 2, a) wherein the top surface at the back side of the front section is configured to slide towards and away from the main body, and b) wherein the bottom surface at the back side of the front section is configured to slide towards and away from the main body.

6. The wing of claim 5, comprising:

a) a top-front slot defined in the main body adjacent the top surface of the main body at the forward end;

b) a bottom-front slot defined in the main body adjacent the bottom surface of the main body at the forward end;

c) a top-front tab extending from the back side of the front section at the top surface of the front section;

d) a bottom-front tab extending from the back side of the front section at the bottom surface of the front section;

e) a third actuator connecting the forward end of the main body to the front section, wherein the third actuator is configured to move the top-front tab in and out of the top-front slot;

f) a fourth actuator connecting the forward end of the main body to the front section, wherein the fourth actuator is configured to move the bottom-front tab in and out of the bottom-front slot.

7. The wing of claim 6, wherein the length of the chord line and the radius of the camber are dependent on a position of the top-front tab inside the top-front slot and the bottom-front tab inside the bottom-front slot.

8. The wing of claim 7, wherein the third actuator is configured to act independently of the fourth actuator, and the fourth actuator is configured to act independently of the third actuator.

9. A method of changing a configuration of a wing, the method comprising the steps of:

a) providing a wing, comprising: a front section defining a leading edge and a back side opposite the leading edge; a back section opposite the front section, the back section defining a trailing edge and a front side opposite the trailing edge; an outboard end adjacent to the front section and the back section; an inboard end opposite the outboard end, and adjacent to the front section and the back section; a main body in between the front section and the back section; a top surface from the leading edge to the trailing edge; a bottom surface opposite the top surface from the leading edge to the trailing edge, wherein the main body comprises a forward end and a rearward end opposite the forward end, wherein the forward end of the main body is connected to the back side of the front section, and the rearward end of the main body is connected to the front side of the back section, wherein the wing defines a chord line having a length from the leading edge to the trailing edge, and wherein the top surface defines a camber having a radius; a first actuator at the inboard end connecting the main body to the back section; and a second actuator at the outboard end connecting the main body to the back section; and b) sliding one or more of the top surface at the front side of the back section and the bottom surface at the front side of the back section towards and away from the main body within a respective slot defined in the main body, wherein the respective slot constrains its respective top surface or bottom surface to slide in a fore and aft direction within the respective slot, whereby the configuration of the wing is changed; and c) independently actuating the first actuator at the inboard end and the second actuator at the outboard end such that at least one of the length of the chord line and the radius of the camber at the inboard end is independently adjustable relative to the length of the chord line and the radius of the camber, respectively, at the outboard end.

10. The method of claim 9, wherein asymmetrical movement of the top surface at the front side of the back section and the bottom surface at the front side of the back section changes the configuration of the wing by changing the radius of the camber.

11. The method of claim 9, wherein symmetrical movement of the top surface at the front side of the back section and the bottom surface at the front side of the back section changes the configuration of the wing by changing the length of the chord line.

12. The method of claim 9, further comprising the step of sliding one or more of the top surface at the back side of the front section and the bottom surface at the back side of the front section towards and away from the main body to change the configuration of the wing.

13. The method of claim 12, wherein asymmetrical movement of the top surface at the back side of the front section and the bottom surface at the back side of the front section changes the configuration of the wing by changing the radius of the camber.

14. The method of claim 12, wherein symmetrical movement of the top surface at the back side of the front section and the bottom surface at the back side of the front section changes the configuration of the wing by changing the length of the chord line.

* * * * *